US010529305B2

(12) United States Patent
Satterlee et al.

(10) Patent No.: US 10,529,305 B2
(45) Date of Patent: Jan. 7, 2020

(54) KEY HEIGHT ADJUSTER FOR A BRASS INSTRUMENT

(71) Applicants: Eric Satterlee, Haslett, MI (US); Timothy McAllister, Ann Arbor, MI (US)

(72) Inventors: Eric Satterlee, Haslett, MI (US); Timothy McAllister, Ann Arbor, MI (US)

( * ) Notice: Subject to any disclaimer, the term of this patent is extended or adjusted under 35 U.S.C. 154(b) by 0 days.

(21) Appl. No.: 15/944,443

(22) Filed: Apr. 3, 2018

(65) Prior Publication Data

US 2018/0293966 A1 Oct. 11, 2018

Related U.S. Application Data

(60) Provisional application No. 62/483,257, filed on Apr. 7, 2017.

(51) Int. Cl.

*G01D 9/04* (2006.01)
*G10D 9/04* (2006.01)
*G10D 7/08* (2006.01)

(52) U.S. Cl.

CPC ............... *G10D 9/043* (2013.01); *G10D 7/08* (2013.01)

(58) Field of Classification Search

CPC ................................ G10D 9/043; G10D 7/08
See application file for complete search history.

(56) References Cited

U.S. PATENT DOCUMENTS 5,477,766 A * 12/1995 Ellsworth ............. G10D 9/043 84/382
7,544,874 B2 * 6/2009 Hsieh ....................... G10D 7/08 84/385 P

* cited by examiner

*Primary Examiner* — Kimberly R Lockett
(74) *Attorney, Agent, or Firm* — Fitch, Even, Tabin & Flannery, LLP

(57) ABSTRACT

A key guard height adjuster for a brass instrument having a threaded rod configured to be received by a threaded bore of a key guard; a stem connecting the threaded rod to a key guard height adjuster head; and the adjuster head having a rounded top and a knurled edge. According to one approach, the adjuster head height can be in the range of about 4 mm to 10 mm. According to one approach, the adjuster head diameter is in the range of about 8 mm to 12 mm. According to one approach, the adjuster head is about 8 mm in width and about 6 mm in height.

4 Claims, 5 Drawing Sheets

KEY HEIGHT ADJUSTER FOR A BRASS INSTRUMENT

CROSS REFERENCE TO RELATED APPLICATIONS

This application claims priority from the U.S. patent application Ser. No. 62/483,257, filed Apr. 7, 2017, which is hereby incorporated herein by reference in its entirety for all purposes.

FIELD

A key height adjusters for a brass instrument are described herein and, in particular, key height adjusters configured for easy adjustment and voicing of a wind instrument.

BACKGROUND

A musical instrument is a device created or adapted to make musical sounds. The principal types of such instruments are typically classified by the method of producing sound, and can include percussion, stringed, keyboard, wind, and electronic instruments. A saxophone, for example, is a wind instrument and is usually made of brass and played with a single-reed mouthpiece. Brass instruments produce sound by sympathetic vibration of air in a tubular resonator in sympathy with the vibration of the player's lips. The length of this tubular resonator can be effectively lengthened and shortened to opening holes along this tubular resonator (i.e., the body of the instrument) with many bends in it (i.e., the instrument). Opening and closing of keys positioned along the body of the instrument to shorten or lengthen the effective length of the instrument body raises and lowers the pitch of the instruments sound respectively. Key guards are positioned above various keys to protect the key and to limit the amount the key can be opened. Further, the voice of the saxophone can be set by adjusting the amount the key can be opened using key guard screws. The position of these key guard screws are typically set by a professional technician and are not moved by the user of the instrument.

In the art, accessories and adaptations have been developed to modify, enhance, change and/or dampen the sound of an instrument. Such accessories provide added expression, amplitude and/or quality of sound. Despite development of such accessories, further devices and assemblies are desired to add further tonal variation and even improvement of the sound of a brass woodwind instrument.

SUMMARY

Accordingly, key height adjusters for a brass instrument are described herein and, in particular, a key height adjusters configured for easy adjustment and voicing of a wind instrument.

In one embodiment, a key guard height adjuster for a brass instrument is provided having a threaded rod configured to be received by a threaded bore of a key guard; a stem connecting the threaded rod to a key guard height adjuster head; and the adjuster head having a rounded top and a knurled edge.

According to one approach, the adjuster head height is in the range of about 4 mm to 10 mm. According to one approach, the adjuster head diameter is in the range of about 8 mm to 12 mm. According to one approach, the adjuster head is about 8 mm in width and about 6 mm in height.

ELEMENT NUMBERS

Figure 1:
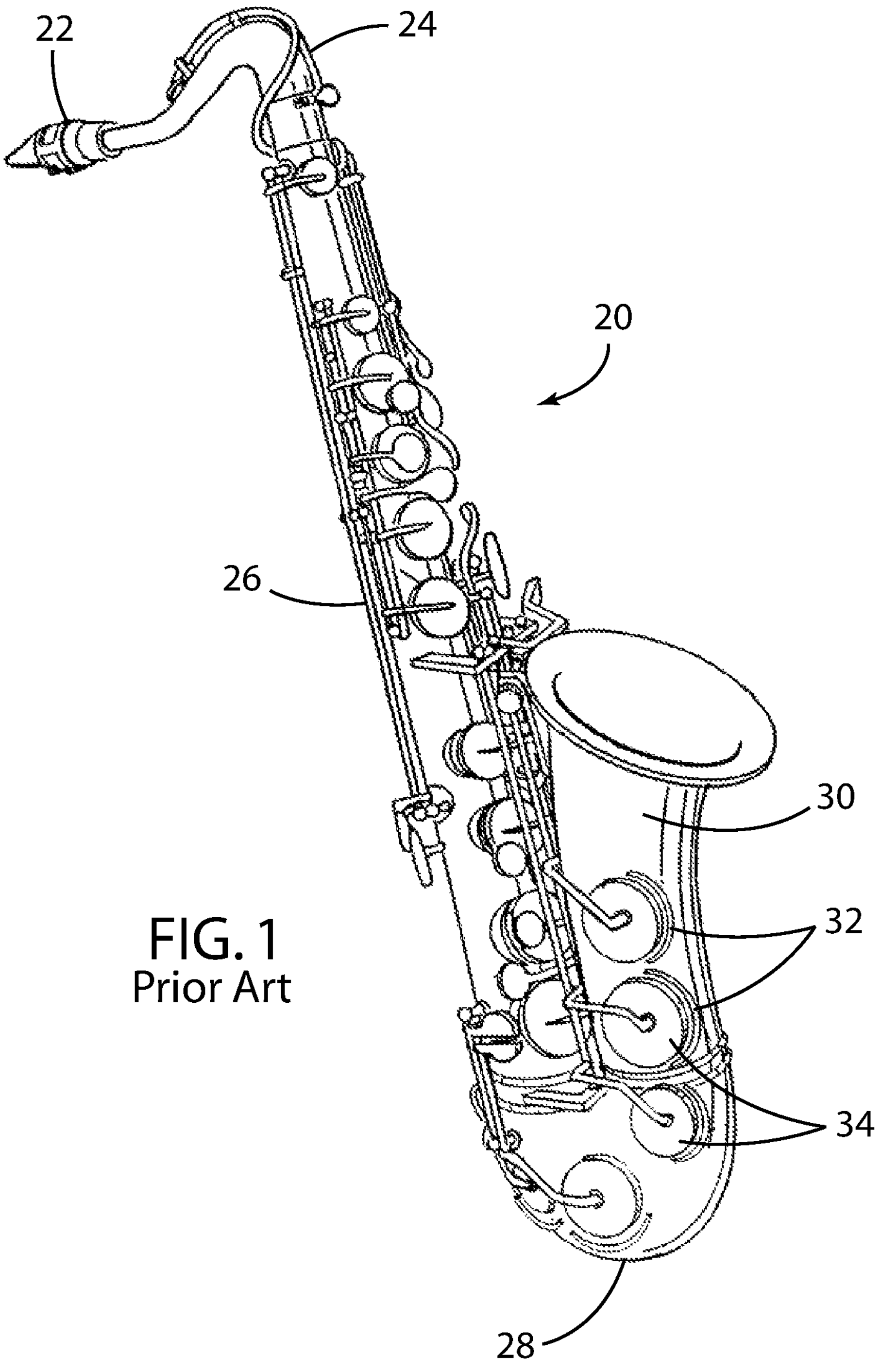
FIG. 1 Prior Art
FIG. 1 illustrates a prior art saxophone having keys (See, FIG. 1 of U.S. Pat. No. 6,265,649 to Rienk Smeding)

- 20 exemplary instrument (horn)(brass)
- 22 mouthpiece
- 24 neck
- 26 body
- 28 bow
- 30 bell
- 32 tone holes
- 34 keys
- 36 dual key adjuster guard
- 38 key guard eyelets to mount to instrument 20
- 40 prior art key height adjuster
- 42 threaded bore of key guard to receive key height adjuster
- 44 felt or other pliable material
- 46 slot to receive slotted screwdriver to adjust
- 48 threaded column
- 50 user adjustable key height adjuster
- 52 head for user adjustable key height adjuster
- 54 knurled edge for user adjustable key height adjuster
- 56 stem to head of user adjustable key height adjuster
- 60 single key adjuster guard

DETAILED DESCRIPTION

A key height adjusters for a brass instrument are described herein and, in particular, a key height adjuster configured for easy adjustment and voicing of a wind instrument. In use, the exemplary embodiments can provide more flexibility to a user of a brass woodwind instruments.

In the art, there is a question of the proper height to set the key on a saxophone. In its most element form, the key heights on a saxophone must be open enough for the saxophone to sing. More specifically, the key heights should be set for the instrument to play in tune with a full and responsive tone.

Although there are many techniques for tuning and toning a saxophone, proper key heights are the first and most important step of the procedure. Once key heights are set other methods of additional tuning and toning are much simpler. Traditionally key heights have been set by the instrument technician to subjectively look and feel correct.

Some instrument technicians keep lists of key heights they have been successful with on certain models of saxophones. These methods have often been based in beliefs that all of the keys need to be set to the same height for the saxophone to play well or that the upper and lower stack heights need to match in order for the instrument to play with a balanced tone. After using a method that sets key heights based solely on tone, intonation and response, each instrument will dictate its own specific optimal key height to the repairer or player. (See, Setting Key Heights with The Balanced Venting Method: (http://musicmedic.com/setting-key-heights-with-the-balanced-venting-method)

Despite the technician set approach to key heights, as musicians expand and seek new and changing sounds from their instruments, new devices must be developed to address these needs. One such need is the ability to rapidly adjust the height of the saxophone keys to achieve a specific voice for the instrument and to even vary the voice of individual keys among the various keys covered by key guards. It is an object of the present embodiments to provide an accessory to a key guard to allow instant changes to the position of a key height guard by a player without the need for additional tools typically used by a saxophone technician. It is noted that while the present embodiments are described as a rounded knob with a knurled edge, other types of embodiments would also be included for consideration among the present embodiments, including any key height adjuster that allows a user to adjust the key guard height without additional tools, without affecting the play of the instruments, or interfering with the player's hand movement.

Figure 2:
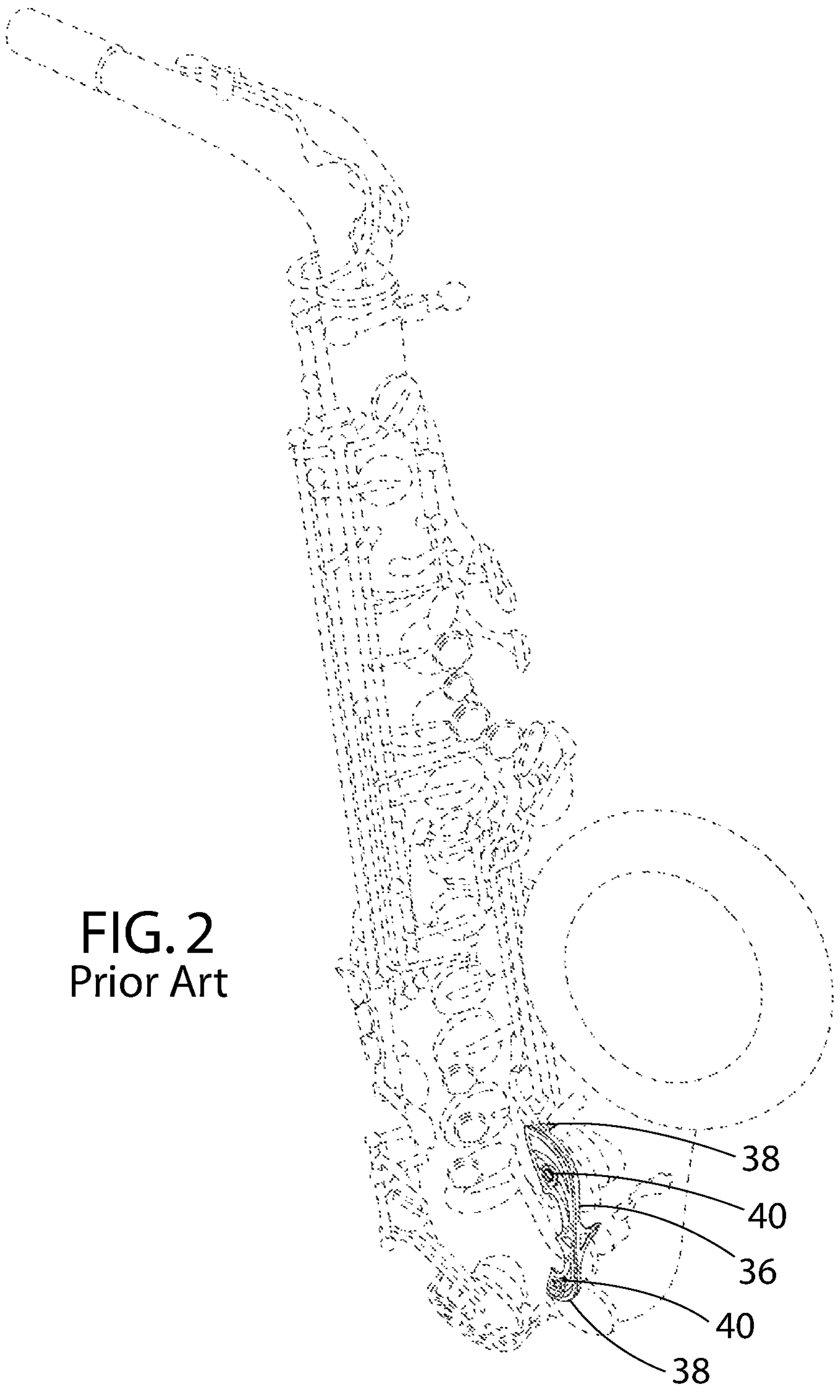
FIG. 2 Prior Art
FIG. 2 illustrates a reduced top perspective view of a key guard for a saxophone (See, FIG. 1 of USD710935 to Sheryl Laukat, et al.)
Figure 3:
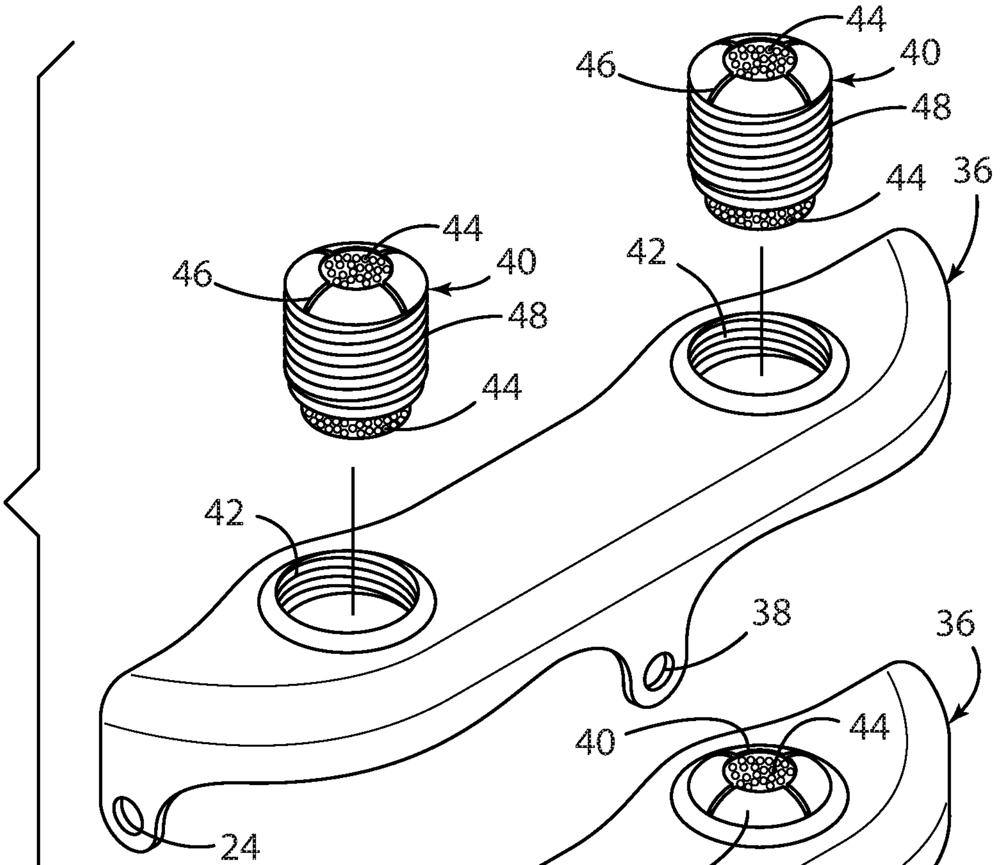
FIG. 3 Prior Art
FIG. 3 illustrates a PRIOR ART exploded top perspective view of a key guard with two key height adjusters.
Figure 4:
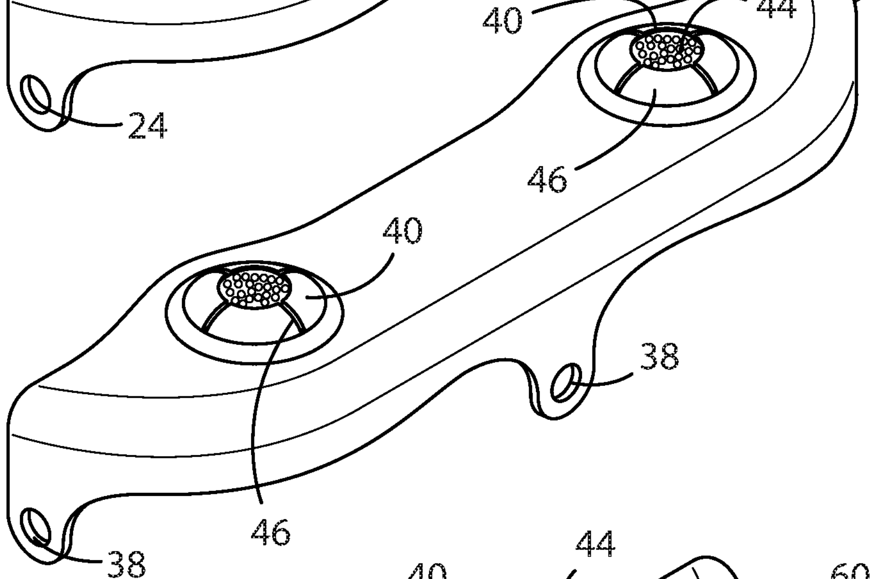
FIG. 4 Prior Art
FIG. 4 illustrates a PRIOR ART assembled top perspective view of a key guard with two key height adjusters.
Figure 6:
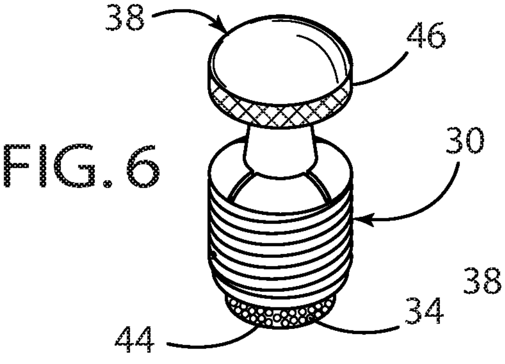
FIG. 6 illustrates an exemplary key height adjuster of the present embodiments.
Figure 5:
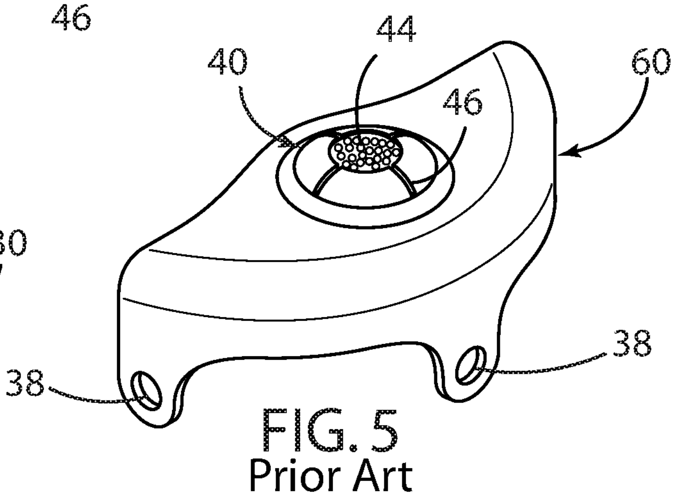
FIG. 5 Prior Art
FIG. 5 illustrates a PRIOR ART assembled top perspective view of a key guard with a single key height adjuster.

Turning now to the figures, FIGS. 1-5 illustrates the prior art saxophone (FIG. 1), having a key guard (FIG. 2), with key height levelers (FIGS. 3-5). FIG. 1 shows an exemplary prior art saxophone 20 having a mouthpiece 22, a neck 24, a body 26, a bow 28, a bell 30, tone holes 32 and keys 34. FIG. 2 shows a prior art dual key adjuster guard 36 having key guard eyelets feet and eyelets 38 to mount to instrument 20. Key adjuster guard 36 has a key height adjuster 40.

FIGS. 3-5 show key adjuster guard 36 (guard 60 for FIG. 5) having a threaded bore 42 of key guard to receive key height adjuster 40. As shown key height adjuster 40 has a felt 44 or other pliable material to come into contact and provide a soft stop for a raised key 34. A prior art key height adjuster 40 has a slot 46 to receive slotted screwdriver to adjust the key height adjuster 40 height. Key height adjuster 40 also has a threaded column 48 to match the threaded bore 42 of key guard 36/60.

Figure 7:
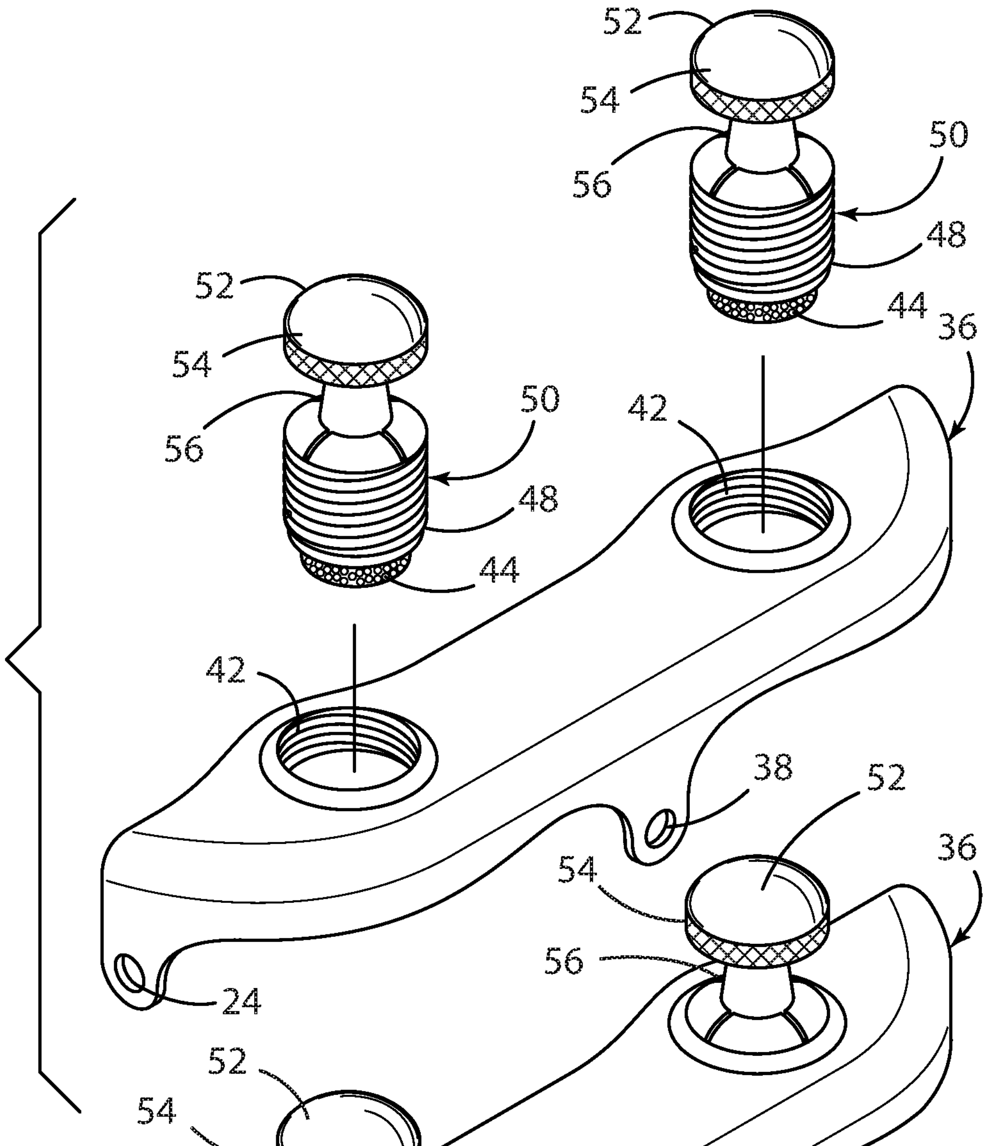
FIG. 7 illustrates an exploded top perspective view of a key guard with two key height adjusters of FIG. 6.
Figure 8:
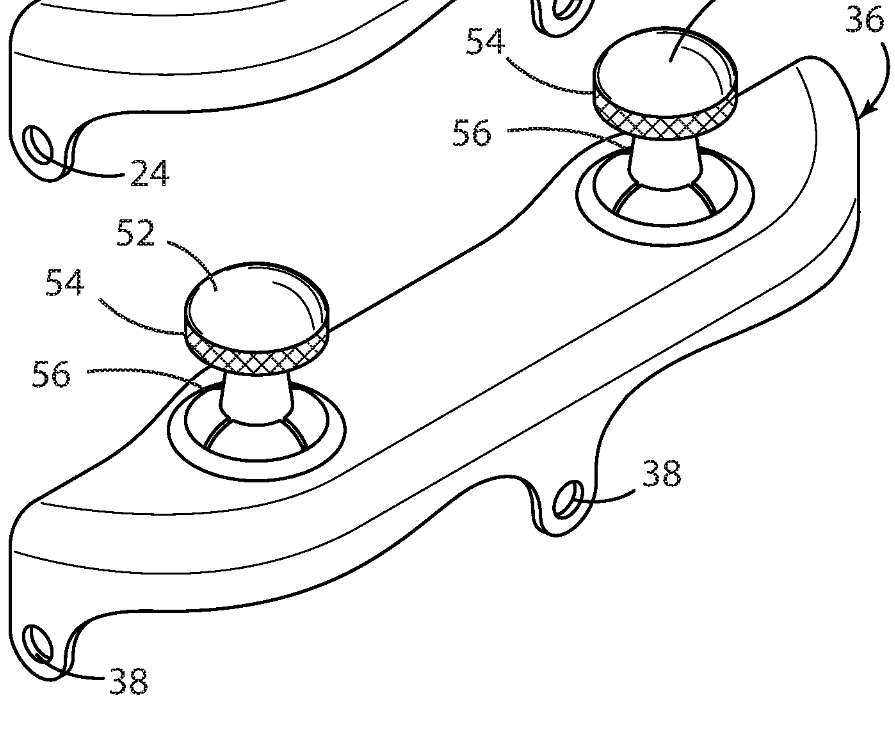
FIG. 8 illustrates an assembled top perspective view of a key guard with two key height adjusters of FIG. 6.
Figure 9:
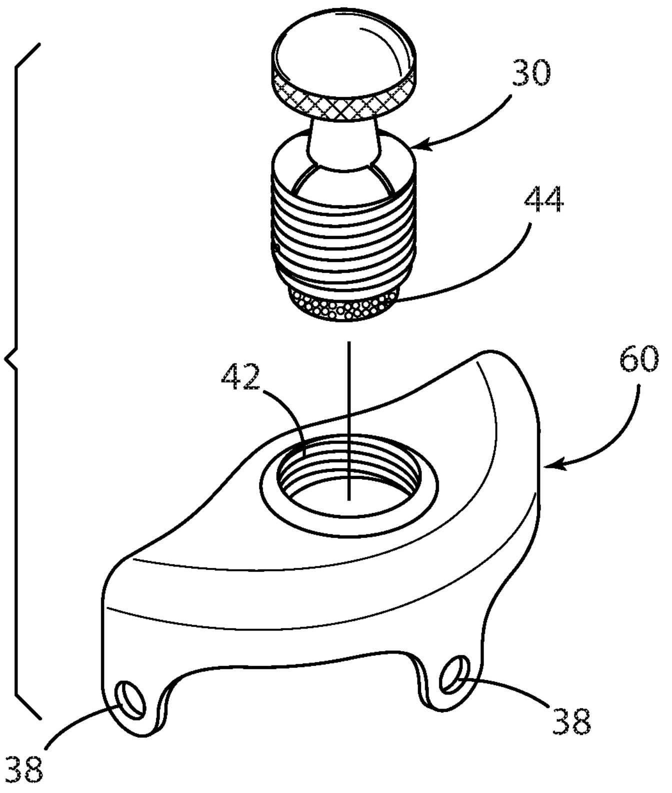
FIG. 9 illustrates an exploded top perspective view of a key guard with a single key height adjuster of FIG. 6.
Figure 10:
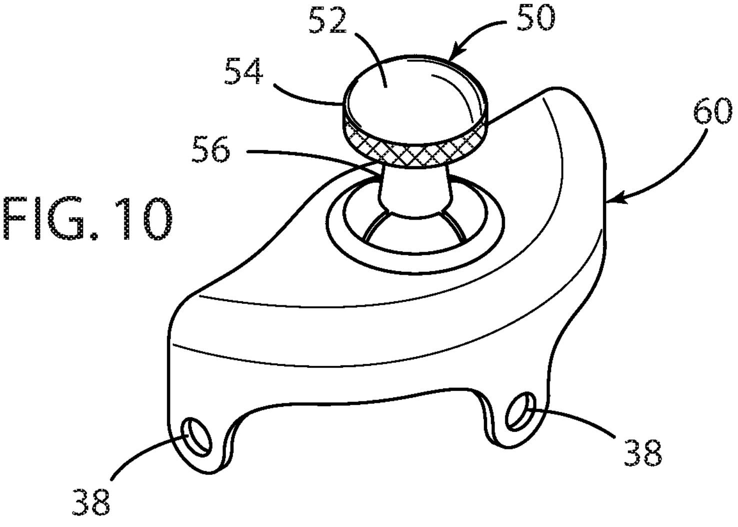
FIG. 10 illustrates an assembled top perspective view of a key guard with a single key height adjuster of FIG. 6.

The present embodiments provide a novel key height adjuster 50 as shown in FIGS. 6-16. As shown user adjustable key height adjuster 50 provides enhanced toning of an instrument by a user, even while playing the instrument. As shown, user adjustable key height adjuster 50 has a rounded head 50 having a knurled edge 54. Rounded head 50 is connected to threaded column 48 by a stem 56. This configuration allows a user to turn the user adjustable key height adjuster 50 to raise and lower it through the action of the threads 48. FIGS. 7-8 show a dual key adjuster guard 36 with adjustment for each key 34 disposed underneath it when attached to the saxophone 20. FIGS. 9-10 show a single key adjuster guard 60.

The present embodiments of a user adjustable key height adjuster 50 can be made of brass or any other material that can be threaded and frequently turned by a user for adjustment. Head 52 of user adjustable key height adjuster 50 has been shown as a rounded and knurled knob. Head 52 height can be in the range of about 4 mm to 10 mm. Head 52 diameter can be about 8 mm to 12 mm. The dimension allow a user to firmly and comfortably grasp head 52. Head 52 can be of a variety of dimensions and in one embodiment is about 8 mm in width and about 6 mm in height. It is noted though that head 52 can also be square, oval, or other geometrical shapes that a user may use to grip and turn the adjuster.

While the invention herein disclosed has been described by means of specific embodiments, examples and applications thereof, numerous modifications and variations could be made thereto by those skilled in the art without departing from the scope of the invention set forth in the claims.

We claim:

1. A user adjustable key height adjuster for a wind instrument, comprising:

- a threaded rod configured to be received by a threaded bore of a key guard;
- a stem connecting the threaded rod to a key guard height adjuster head; and
- the adjuster head having a rounded top and a knurled edge providing instantaneous adjustment and voicing of the wind instrument,
- a distal end of the threaded rod composed of a pliable material to engage the key, wherein the amount the key is raiseable from the body of the wind instrument is limitable, and
- wherein instantaneous adjustment the tuning and toning of the wind instrument is achieved by the instantaneous adjustment and voicing.

2. The key height adjuster of claim 1, wherein the adjuster head height is in the range of about 4 mm to 10 mm.

3. The key height adjuster of claim 1, wherein the adjuster head diameter is in the range of about 8 mm to 12 mm.

4. The key height adjuster of claim 1, wherein the adjuster head is about 8 mm in width and about 6 mm in height.

* * * * *